United States Patent
Kawasaki

(10) Patent No.: US 9,929,617 B2
(45) Date of Patent: Mar. 27, 2018

(54) ELECTRIC MOTOR AND ELECTRICAL DEVICE EQUIPPED WITH ELECTRIC MOTOR

(71) Applicant: Panasonic Intellectual Property Management Co., Ltd., Osaka (JP)

(72) Inventor: Hiroaki Kawasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 308 days.

(21) Appl. No.: 14/773,754

(22) PCT Filed: Mar. 7, 2014

(86) PCT No.: PCT/JP2014/001281
§ 371 (c)(1),
(2) Date: Sep. 8, 2015

(87) PCT Pub. No.: WO2014/141656
PCT Pub. Date: Sep. 18, 2014

(65) Prior Publication Data
US 2016/0028289 A1    Jan. 28, 2016

(30) Foreign Application Priority Data

Mar. 15, 2013   (JP) .................................. 2013-052844

(51) Int. Cl.
*H02K 5/16*   (2006.01)
*H02K 1/27*   (2006.01)
(Continued)

(52) U.S. Cl.
CPC ............. *H02K 5/161* (2013.01); *H02K 1/276* (2013.01); *H02K 1/278* (2013.01); *H02K 1/30* (2013.01);
(Continued)

(58) Field of Classification Search
CPC ...................................................... H02K 5/161
See application file for complete search history.

(56) References Cited

U.S. PATENT DOCUMENTS 5,157,297 A * 10/1992 Uchida ................ H02K 1/2773
                                                  310/156.61
5,704,111 A * 1/1998 Johnson .................... H02K 1/30
                                                  29/451

(Continued)

FOREIGN PATENT DOCUMENTS

| CN | 101971460 A | 2/2011 |
|---|---|---|
| JP | 2002-110652 | 4/2002 |

(Continued)

OTHER PUBLICATIONS

English Translation of Chinese Search Report dated Apr. 20, 2017 for the related Chinese Patent Application No. 201480016139.3.

(Continued)

*Primary Examiner* — Robert W Horn
(74) *Attorney, Agent, or Firm* — Hamre, Schumann, Mueller & Larson, P.C.

(57) ABSTRACT

An electric motor (40) includes stator (10), rotor (14) including rotation body (20), a pair of bearings (15), and a pair of brackets (17, 24). Rotation body (20) includes outer iron core (25), inner iron core (26), and dielectric layer (23). Outer iron core (25) is located in the outer side of rotation body (20). Inner iron core (26) is fixed to shaft (16). Dielectric layer (23) is located between outer iron core (25) and inner iron core (26) and includes at least two dielectric bodies different in dielectric constant.

14 Claims, 12 Drawing Sheets

(51) Int. Cl.
*H02K 7/00* (2006.01)
*H02K 11/00* (2016.01)
*H02K 1/30* (2006.01)
*H02K 11/33* (2016.01)
*H02K 5/173* (2006.01)

(52) U.S. Cl.
CPC ......... *H02K 7/003* (2013.01); *H02K 11/0073* (2013.01); *H02K 5/1732* (2013.01); *H02K 11/33* (2016.01)

(56) References Cited

U.S. PATENT DOCUMENTS

| | | | | |
|---|---|---|---|---|
| 6,069,421 A * | 5/2000 | Smith | ................ | H02K 5/128 29/596 |
| 6,121,709 A * | 9/2000 | Fathimulla | ............... | H02K 1/04 310/216.004 |
| 7,074,019 B2 * | 7/2006 | Knoll | ................ | H02K 1/272 123/41.44 |
| 7,572,115 B2 * | 8/2009 | Klein | ................ | F04D 29/026 310/103 |
| 8,536,756 B2 * | 9/2013 | Watanabe | ............... | H02K 1/30 310/196 |
| 8,901,788 B2 * | 12/2014 | Watanabe | ............. | H02K 1/276 310/156.53 |
| 8,987,955 B2 * | 3/2015 | Mizukami | .......... | H02K 11/0089 310/43 |
| 9,035,503 B2 * | 5/2015 | Trago | ................ | H02K 1/185 310/43 |
| 9,059,615 B2 * | 6/2015 | Kowa | ................ | H02K 5/16 |
| 9,071,090 B2 * | 6/2015 | Watanabe | ............ | H02K 5/1732 |
| 2002/0153783 A1 * | 10/2002 | Lau | ................ | H02K 1/12 310/15 |
| 2005/0253480 A1 * | 11/2005 | Pizzichil | ............... | H02K 1/22 310/261.1 |
| 2007/0290570 A1 * | 12/2007 | Okada | ................ | H02K 7/003 310/261.1 |
| 2011/0043071 A1 | 2/2011 | Mizukami et al. | | |
| 2012/0267967 A1 * | 10/2012 | Trago | ................ | H02K 1/185 310/43 |
| 2012/0274157 A1 * | 11/2012 | Watanabe | ............ | H02K 5/1732 310/43 |
| 2013/0043748 A1 * | 2/2013 | Mizukami | ............. | H02K 11/40 310/71 |
| 2013/0300225 A1 * | 11/2013 | Kurozumi | ................ | H02K 5/08 310/43 |
| 2014/0015363 A1 * | 1/2014 | Kowa | ................ | H02K 5/16 310/156.01 |
| 2016/0028289 A1 * | 1/2016 | Kawasaki | ............. | H02K 1/278 310/68 R |
| 2016/0248296 A1 * | 8/2016 | Nakano | ............... | H02K 5/1732 |

FOREIGN PATENT DOCUMENTS

| | | |
|---|---|---|
| JP | 2007-165755 | 6/2007 |
| JP | 2012-039875 | 2/2012 |
| JP | 2012-239368 | 12/2012 |
| WO | 2009/113311 | 9/2009 |
| WO | 2011/141957 | 11/2011 |

OTHER PUBLICATIONS

International Search Report of PCT application No. PCT/JP2014/001281 dated May 27, 2014.

The Extended European Search Report dated Apr. 6, 2016 for the related European Patent Application No. 14762436.5, 37 pages.

* cited by examiner

US 9,929,617 B2

ELECTRIC MOTOR AND ELECTRICAL DEVICE EQUIPPED WITH ELECTRIC MOTOR

CROSS-REFERENCE TO RELATED APPLICATIONS

This application is a U.S. national stage application of the PCT International Application No. PCT/JP2014/001281 filed on Mar. 7, 2014, which claims the benefit of foreign priority of Japanese patent applications 2013-052844 filed on Mar. 15, 2013, the contents of which are incorporated herein by reference.

TECHNICAL FIELD

The present invention relates to an electric motor improved so as to reduce an occurrence of electric corrosion, particularly in the bearings, and also relates to an electrical device equipped with the motor.

BACKGROUND ART

Many electric motors employs a diver using pulse width modulation (hereinafter, PWM) inverters in recent years. In the case of driving a motor by a PWM inverter, the neutral point potential of the winding is not zero. This causes a potential difference between the inner and outer rings of the bearings (hereinafter, referred to as the shaft voltage).

A shaft voltage contains high-frequency components caused by switching. If the shaft voltage reaches a value that causes insulation breakdown of the oil film existed in the bearings, a small current flows into the bearings, causing electric corrosion in them. If the electric corrosion proceeds, the inner or outer rings of the bearings or the bearing balls cause undulating abrasion, possibly generating abnormal sound. The sound is one main cause of malfunction of the electric motor.

To reduce electric corrosion, the following technique has been proposed. Patent Literature 1, for example, has proposed a technique in which the rotor includes a dielectric layer. This structure reduces the shaft voltage, and hence, reduces occurrence of the electric corrosion.

CITATION LIST

Patent Literature

PPL 1: WO 2009/113311

SUMMARY OF THE INVENTION

The electric motor of the present invention includes a stator, a rotor, a pair of bearings, and a pair of brackets.

The stator includes a stator core around which a winding is wound. The rotor includes a rotation body including a permanent magnet extending circumferentially and facing the stator, and a shaft passing through the shaft center of the rotation body. The pair of bearings support the shaft rotatably, and the pair of brackets fix the bearings.

In particular, the rotation body includes an outer iron core, an inner iron core, and a dielectric layer.

The outer iron core is located in the outer side of the rotation body. The inner iron core is fixed to the shaft. The dielectric layer is located between the inner and outer iron cores. The dielectric layer includes at least two dielectric bodies different in dielectric constant.

DESCRIPTION OF EMBODIMENTS

Figure 1:
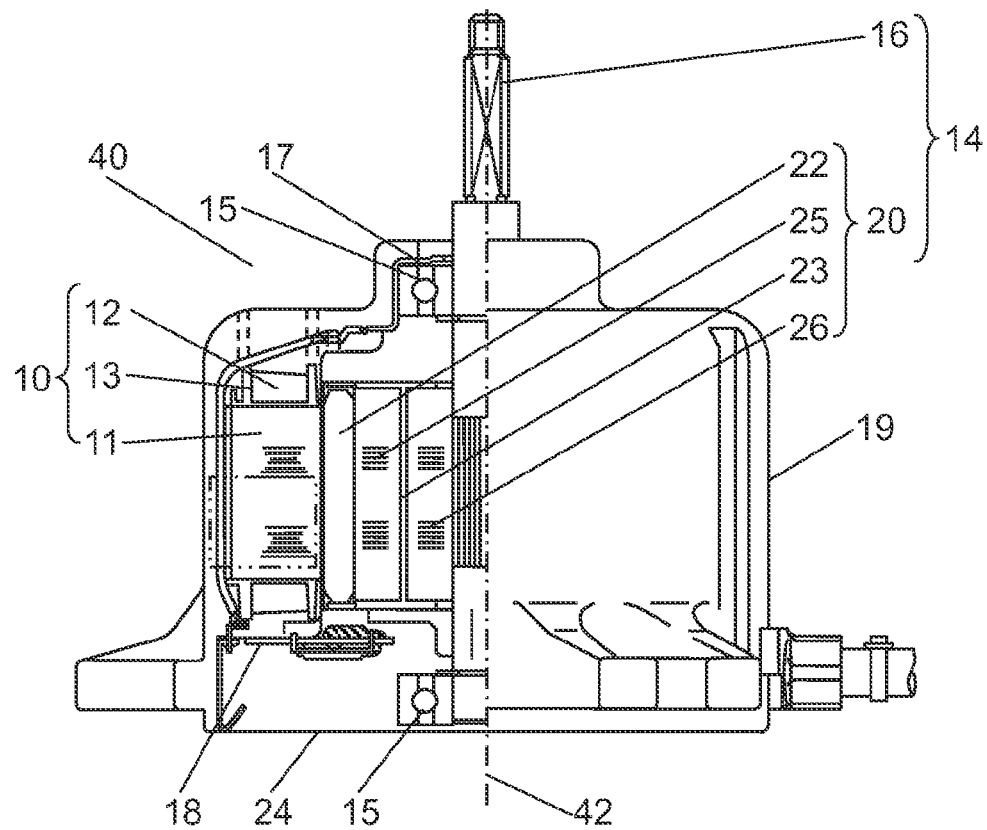
FIG. 1 is a sectional view of an electric motor according to a first exemplary embodiment of the present invention.

In the electric motor according to the following exemplary embodiments of the present invention, a shaft voltage is settable in an appropriate range. More specifically, the motor includes a rotation body including a plurality of dielectrics. The plurality of dielectrics are, for example, multi-layered resins different in dielectric constant. This structure allows the capacitance between the inner and outer cores to be easily changed. The motor having an appropriate shaft voltage is provided by changing the capacitance between the inner and outer cores.

Thus, the present invention is able to provide a motor that effectively reduces electric corrosion in the bearings, and also to provide an electrical device that is equipped with a motor that effectively reduces electric corrosion in the bearings.

The conventional electric motor has the following points on which care should be taken.

According to the technique of Patent Literature 1, the capacitance of the dielectric layer is used to reduce the high-frequency voltage induced by the bearing inner rings. It is, however, sometimes difficult to make the dielectric layer suitable to obtain an appropriate shaft voltage.

Thus, in the conventional motor, an appropriate shaft voltage can be obtained if the capacitance of the dielectric layer can be changed flexibly. According to the conventional motor, the capacitance is changed by the methods described below.

The conventional motor includes a rotor including a rotation body and a shaft. The rotation body includes an outer iron core, an inner iron core, and a dielectric layer located between the inner and outer iron cores. The dielectric layer is made of an insulating resin.

One of the above-mentioned methods is to change the distance between the inner and outer iron cores of the rotation body. Changing the distance between the inner and outer iron cores changes the thickness of the insulating resin. The capacitance is changed by changing the thickness of the insulating resin changes.

Another method is to change the lengths of the inner and outer iron cores along the shaft center. Changing the lengths of the inner and outer iron cores along the shaft center changes the area where the cores face each other. The capacitance is changed by changing the area where the cores face each other.

Still another method is to change the dielectric constant of the insulating resin from which the dielectric layer is made. The capacitance is changed by changing the dielectric constant of the insulating resin.

In an electrical device equipped with an electric motor, the space available for the installation of the motor is roughly determined according to the electrical device. Therefore, the size of the motor is determined according to the space available, and the size of the rotor used in the motor is automatically determined.

The size of rotors is generally standardized, and it is difficult to greatly change the standardized size according to the motor. If the size of a rotor is changed, there are the following cautions. Changing the shape of the iron cores of the rotor requires changing the molds for them, which is not easy because it needs cost and time. The outer iron core serves as a magnet yoke, and its length along the shaft center affects the efficiency and other properties of the motor. The inner iron core is fixed to the axis. The length of the inner iron core along the shaft center affects the strength of the fixation between the rotor and the shaft. Thus, it is not easy to change the inner and outer iron cores.

In the case of changing the dielectric constant of the insulating resin from which the dielectric layer is made, the resin material can be changed. It is, however, necessary to evaluate items of property other than the dielectric constant, such as the strength. The large number of items of property to be evaluated makes it difficult to change the resin material. Moreover, the shaft voltage changes also depending on the electrical device in which the electric motor is installed.

It is, therefore, very difficult to control the shaft voltage in an appropriate range by changing the resin material alone without changing the shape of the iron cores or their lengths along the shaft center.

The electric motor and the electrical device equipped therewith according to the present invention will now be described with reference to drawings.

Note that the following exemplary embodiments are mere examples of the present invention and are not intended to limit the technical scope of the present invention.

First Exemplary Embodiment

Figure 2A:
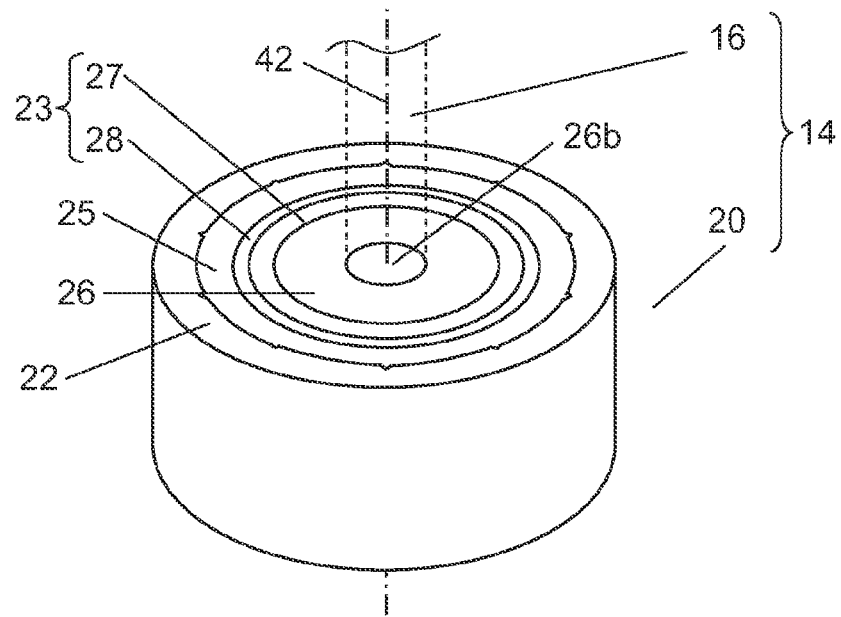
FIG. 2A is a perspective view of a rotation body of the motor according to the first exemplary embodiment of the present invention.
Figure 2B:
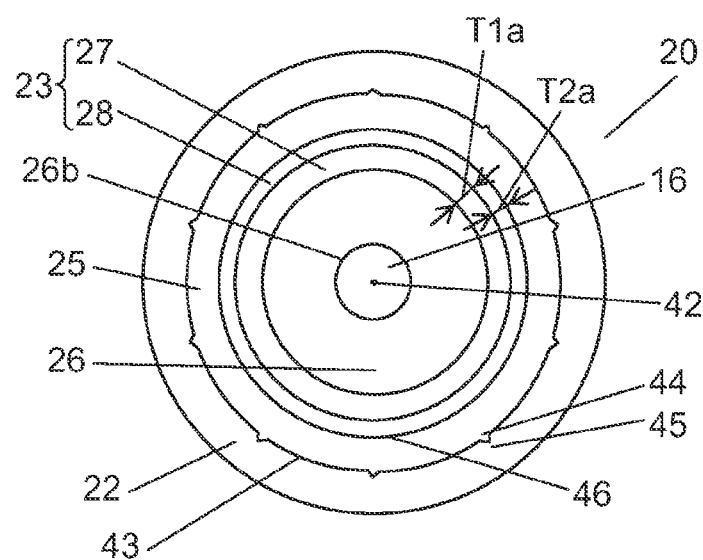
FIG. 2B is a top view of the rotation body of the motor according to the first exemplary embodiment of the present invention.
Figure 2C:
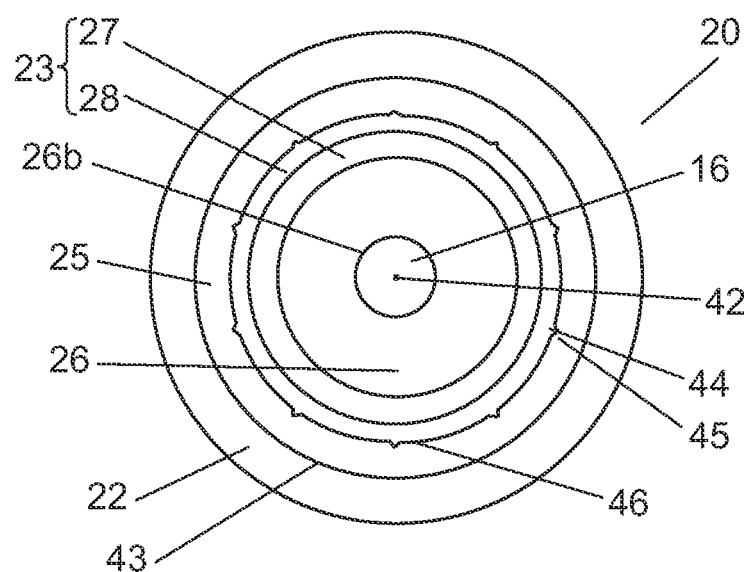
FIG. 2C is a top view of another example of the rotation body, which is different from the one shown in FIG. 2B, of the motor according to first exemplary embodiment of the present invention.
Figure 2D:
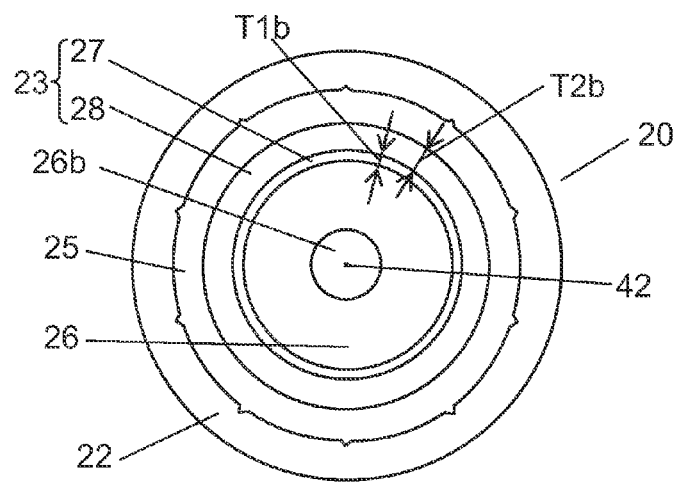
FIG. 2D is a top view of still another example of the rotation body of the motor according to first exemplary embodiment of the present invention.
Figure 2E:
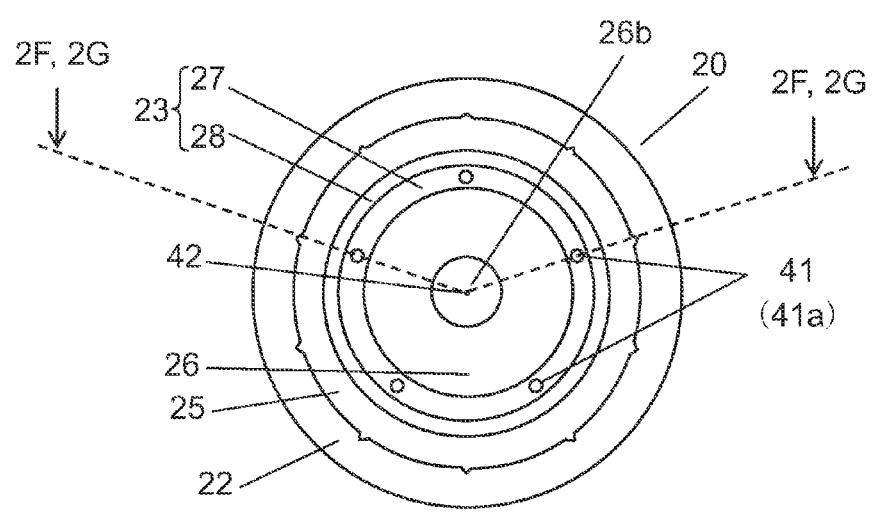
FIG. 2E is a top view of still another example of the rotation body of the motor according to the first exemplary embodiment of the present invention.
Figure 2F:
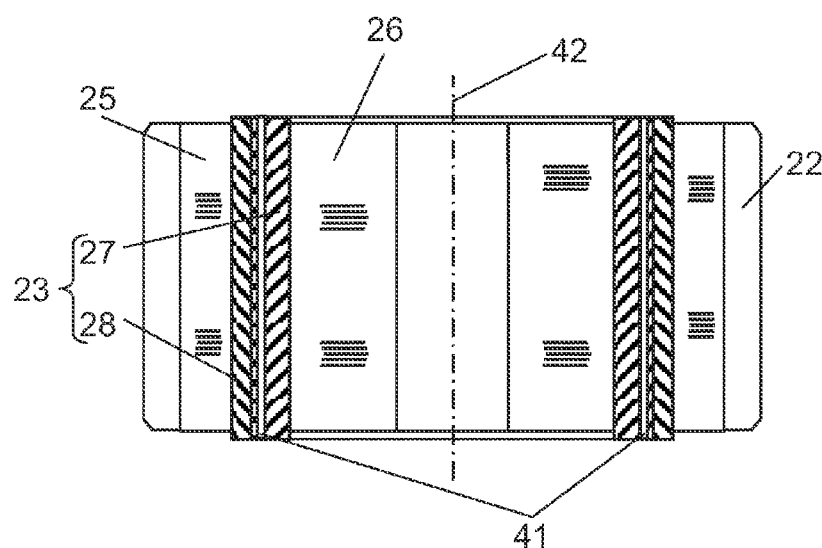
FIG. 2F is a sectional view taken along line 2F-2F shown in FIG. 2E.
Figure 2G:
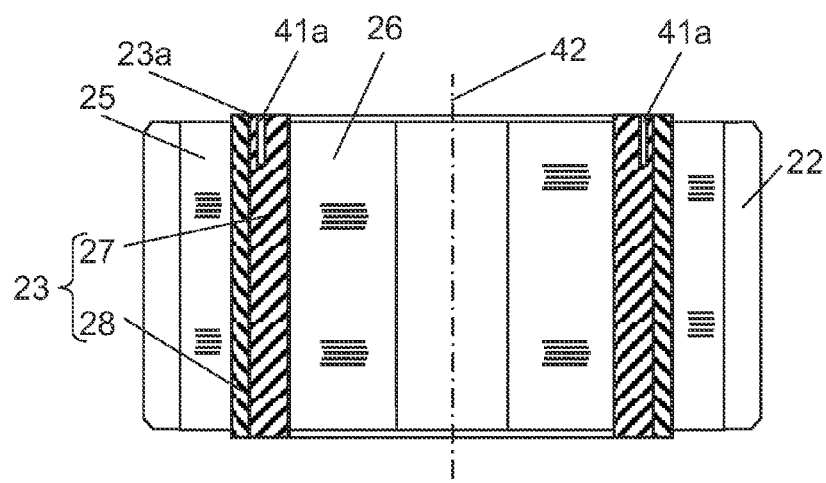
FIG. 2G is a sectional view taken along line 2G-2G shown in FIG. 2E.

FIG. 1 is a sectional view of an electric motor according to a first exemplary embodiment of the present invention. FIG. 2A is a perspective view of a rotation body of the motor according to the first exemplary embodiment of the present invention. FIG. 2B is a top view of the rotation body of the motor according to the first exemplary embodiment of the present invention. FIG. 2C is a top view of another example of the rotation body, which is different from the one shown in FIG. 2B, of the motor according to first exemplary embodiment of the present invention. FIG. 2D is a top view of still another example of the rotation body of the motor according to first exemplary embodiment of the present invention. FIG. 2E is a top view of still another example of the rotation body of the motor according to the first exemplary embodiment of the present invention. FIG. 2F is a sectional view taken along line 2F-2F shown in FIG. 2E. FIG. 2G is a sectional view taken along line 2G-2G shown in FIG. 2E.

The first exemplary embodiment will describe an example of the electric motor mounted in an electrical device. The motor is a brushless motor and an inner rotor type. In an inner rotor type motor, a rotor is rotatably disposed inside the stator.

As shown in FIG. 1, brushless motor 40, which is the electric motor according to the first exemplary embodiment of the present invention, includes stator 10, rotor 14, a pair of bearings 15, and a pair of brackets 17 and 24.

Stator 10 includes stator winding 12 as a winding, and stator core 11 around which stator winding 12 is wound. Rotor 14 includes rotation body 20 and shaft 16. Rotation body 20 includes a permanent magnet, which extends circumferentially and faces stator 10. The permanent magnet is hereinafter referred to simply as magnet 22. Shaft 16 passes through shaft center 42 of rotation body 20. The pair of bearings 15 rotatably support shaft 16. The pair of brackets 17 and 24 fix bearings 15.

Rotation body 20 includes outer iron core 25, inner iron core 26, and dielectric layer 23.

Outer core 25 is located in the outer side of rotation body 20. Inner core 26 is fixed to shaft 16. Dielectric layer 23 is located between outer and inner cores 25 and 26, and includes at least two dielectric bodies different in dielectric constant.

Specific examples of rotation body 20 are shown in FIGS. 2A to 2D. As shown in FIGS. 2A to 2D, dielectric layer 23 has dielectric bodies formed in at least two layers from shaft center 42 outward in the direction orthogonal to shaft center 42. In rotation body 20 of the first exemplary embodiment, the phrase "the direction orthogonal to shaft center 42" indicates the radial direction of cylindrical rotation body 20 as shown in FIGS. 2B and 2D. Dielectric layer 23 used in the first exemplary embodiment includes two layers of dielectrics. A dielectric body located on the shaft 16 side is referred to internal dielectric body 27. A dielectric body located on the outer circumferential side is referred to external dielectric body 28.

Further examples of rotation body 20 are shown in FIGS. 2E to 2G. As shown in FIGS. 2E and 2F, internal dielectric body 27 has holes 41 penetrating it along shaft center 42. Holes 41 may alternatively be provided in external dielectric body 28 or in both internal and external dielectric bodies 27 and 28.

Alternatively, internal dielectric body 27 may have recesses 41a on its surface 23a along shaft center 42 as shown in FIGS. 2E and 2G. Unlike holes 41, recesses 41a do not penetrate internal dielectric body 27, and their depth is determined according to the required dielectric constant.

In internal dielectric body 27, recesses 41a may alternatively be formed on the surface opposite to surface 23a or both of them along shaft center 42. Further alternatively, in internal dielectric body 27, recesses 41a may be formed in external dielectric body 28, or holes 41 may be formed in both internal and external dielectric bodies 27 and 28.

Besides the circular shape shown in FIGS. 2E to 2G, holes 41 and recesses 41a may have an oval, polygonal, or other cross section if necessary.

The above-described configurations can change the capacitance between the outer and inner cores, thereby providing an electric motor having an appropriate shaft voltage. The motor effectively reduces occurrence of electric corrosion in the bearings.

Explanations will now be described in detail with reference to FIGS. 1 to 2E.

As shown in FIG. 1, stator core 11, which has stator winding 12 wound around it. Stator core 11 includes insulating resin 13 as an insulator for providing electrical isolation between core 11 and winding 12. Stator 10 is fixed inside motor case 19 together with other members. Accordingly, rotor 14 has an approximately cylindrical outer shape. Stator 10 may be formed by molding an insulating resin.

Rotor 14 is placed inside stator 10 with a space between them. As shown in FIG. 2A, rotor 14 includes rotation body 20 and shaft 16. Rotation body 20 is columnar, but may alternatively be discoid. Shaft 16 passes through shaft center 42 of rotation body 20 and is fixed to rotation body 20. Rotation body 20 includes magnet 22 as a permanent magnet extending circumferentially and facing the inner side of the stator. Magnet 22 can be, for example, a ferrite resin magnet or a ferrite sintered magnet.

As shown in FIG. 1, rotation body 20 has outer core 25, dielectric layer 23, and inner core 26 arranged in that order from magnet 22 at the outermost position toward shaft 16 at the innermost position. Outer core 25 is located in the outer side of rotation body 20. Inner core 26 is located in the inner side of rotation body 20. Thus, rotation body 20 of the first exemplary embodiment includes the rotor core including outer and inner cores 25 and 26, dielectric layer 23, and magnet 22, all of which are molded integrally. Thus, the inner side of stator 10 and the outer side of rotation body 20 face each other.

As shown in FIG. 1, bearings 15 are attached to shaft 16 of rotor 14 so as to support shaft 16. Bearings 15 are cylindrical and include a plurality of iron balls. One of bearings 15 is fixed to metal bracket 17 molded integrally with a molding resin, whereas the other of bearings 15 is fixed to metal bracket 24.

In this configuration, shaft 16 is supported by bearings 15, allowing rotor 14 to rotate.

Brushless motor 40 includes printed circuit board 18 in motor case 19. Board 18 includes a driving circuit equipped with a control circuit.

Board 18 is connected to connecting wires. The connecting wires includes a lead wire for applying a control voltage to board 18 in order to control the power supply voltages of stator winding 12 and the control circuit, and the number of revolutions. The connecting wires further include a ground wire to the control circuit.

These connecting wires provide brushless motor 40 thus structured with the power supply voltages and control signals. Based on the power supply voltages and the control signals, the driving circuit mounted on board 18 generates a drive current to be supplied to stator winding 12. When the drive current is supplied to stator winding 12, stator core 11 generates a magnetic field. The magnetic field generated by stator core 11 and the magnetic field generated by magnet 22 generate suction and repulsive forces according to the polarities of these magnetic fields. The suction and repulsive forces allow rotor 14 to rotate about shaft 16.

As shown in FIGS. 2A to 2D, rotation body 20 has outer core 25, dielectric layer 23 including internal and external dielectric bodies 27 and 28, and inner core 26 arranged in that order from magnet 22 at the outermost position toward shaft 16 at the innermost position. Dielectric layer 23 is made of insulating resins. The resins are hereinafter referred to also as the dielectric bodies. In the first exemplary embodiment, dielectric layer 23 is provided to reduce occurrence of electric corrosion. Rotation body 20 includes magnet 22, outer core 25, dielectric layer 23, and inner core 26, all of which are molded integrally.

Inner core 26 has, in its inside, shaft insertion hole 26b for inserting shaft 16. Shaft 16 is fixed to inner core 26 in shaft insertion hole 26b. Shaft 16 is fixed to rotation body 20 via shaft insertion hole 26b so as to form rotor 14. Rotor 14 is supported by the bearings.

In rotation body 20, dielectric layer 23 includes internal and external dielectric bodies 27 and 28, which are insulators. Dielectric layer 23 has dielectric bodies 27 and 28 arranged in two layers in the direction orthogonal to shaft center 42. Internal and external dielectric bodies 27 and 28 arranged in two layers divide outer and inner cores 25 and 26 in such a manner as to be serially isolated from each other.

Internal and external dielectric bodies 27 and 28 of dielectric layer 23 are made of insulating resins different in dielectric constant from each other. The dielectric constants are controlled within predetermined ranges. A high-frequency current flows across outer and inner cores 25 and 26.

Meanwhile, in the case of using a rotation body not including dielectric layer 23 used in the first exemplary embodiment, bearings have electric corrosion for the following reasons.

The impedance is generally high between the stator core and the brackets although there is a structural difference between different motors. This impedance is referred to as the stator-core-side impedance. In contrast, the impedance between the rotation body and the shaft is low and is referred to as the rotation-body-side impedance.

The stator-core-side impedance includes mainly two impedances. That is, there are impedance between one bracket and the stator core, and impedance between the other bracket and the stator core, with reference to the stator core. The pair of brackets are respectively fixed to corresponding outer rings of the pair of bearings.

The rotation-body-side impedance is generated between the rotation body not including the dielectric layer and the shaft to which the rotation body is fixed. The rotation-body-side impedance is low because the rotation body and the shaft are electrically connected to each other. The inner rings of the pair of bearings are fixed to the shaft.

The brushless motor has an equivalent circuit in which the stator-core-side impedance and the rotation-body-side impedance have been converted into each other. In this situation, the brushless motor is driven by a PWM inverter. In this case, a high-frequency current is generated due to pulse-width modulation by the stator core and other components. The generated high-frequency current flows into the equivalent circuit in which the stator-core-side impedance and the rotation-body-side impedance have been converted into each other. As a result, a potential difference is generated due to the high-frequency current between the outer rings of the bearings electrically connected to the respective brackets and the inner rings electrically connected to the shaft. If the potential difference is high, the bearings have electric corrosion.

Considering the causes of the electric corrosion, the rotation body has a high impedance to reduce an occurrence of electric corrosion in the first exemplary embodiment.

More specifically, as shown in FIG. 1, cores included into rotation body 20 are formed of outer core 25 and inner core 26. Cores included into rotation body 20 have dielectric layer 23 between outer core 25 and inner core 26. Dielectric layer 23 allows rotation body 20 to be equivalent to the circuit to which the capacitance is connected in series. Thus, an increase in the impedance of rotation body 20 results in an increase in the impedance of rotor 14.

In other words, the impedance of a rotor is low when it includes a rotation body including iron cores alone and having a low impedance. In contrast, rotor 14 of the first exemplary embodiment has a high impedance. The "high" impedance is about the same level as that obtained by electrically connecting bracket 17 with bearings 15 and other components.

An increase in the impedance of rotor 14 results in an increase in the voltage drop due to the high-frequency current flowing from rotation body 20 to shaft 16. This reduces the potential generated in shaft 16 due to the high-frequency current.

Thus, the outer rings of bearings 15 are electrically connected to bracket 17. The inner rings of bearings 15 are electrically connected to shaft 16. According to the above-described principle of operation, brushless motor 40 can reduce the potential difference between the inner and outer rings of bearings 15 caused by the high-frequency current. Consequently, a low potential difference is maintained between the inner and outer rings of bearings 15. This reduces the electric corrosion in bearings 15.

Rotation body 20 will now be described in detail.

As shown in FIGS. 2A and 2B, rotation body 20 is in the shape of a cylinder having a plurality of layers. In the first exemplary embodiment, these layers includes inner core 26 formed of a core, dielectric layer 23 formed of an iron core, outer core 25 formed of an iron core, and magnet 22 arranged in that order from shaft 16 at the innermost position toward magnet 22 at the outermost position. Iron cores forming outer core 25 and inner core 26, dielectric bodies forming dielectric layer 23, and magnet 22 are made from different materials from each other. As mentioned above, the dielectric bodies are made of insulating resins.

In the fixation between the iron core and the insulating resins or between the iron core and the magnet, the following structure is employed in order to improve the fixation strength. As shown in FIG. 2B, boundary 43 between outer core 25 and magnet 22 is provided with projections 44 and recesses 45, which are engaged with each other in the direction orthogonal to shaft center 42. This configuration improves the fixation strength between outer core 25 and magnet 22 adjacent to each other.

Projections 44 and recesses 45 engaged with projections 44 may alternatively be formed on boundary 46 on which the iron core and the insulating resins are in contact with each other as shown in FIG. 2C. Alternatively, projections 44 and recesses 45 may be replaced by each other.

Further alternatively, outer core 25 and inner core 26 can be configured to be meshed with each other via dielectric layer 23.

Outer and inner cores 25 and 26 may be identical in length along shaft center 42, but may alternatively be different if necessary.

Internal and external dielectric bodies 27 and 28 of dielectric layer 23 have different dielectric constants from each other. Their dielectric constants are preferably as far from each other as possible to increase the range of the capacitance of dielectric layer 23.

Explanations will now be described in detail with reference to FIGS. 2B and 2D.

In the first exemplary embodiment, internal and external dielectric bodies 27 and 28 have different dielectric constants from each other.

As shown in FIG. 2B, internal and external dielectric bodies 27 and 28 are different in thickness in the direction orthogonal to shaft center 42. In FIG. 2B, the direction orthogonal to shaft center 42 is referred to as the radial direction. In the radial direction, internal dielectric body 27 has a thickness T1$a$, which is larger than the thickness T2$a$ of external dielectric body 28.

When internal dielectric body 27 has a higher dielectric constant than external dielectric body 28, dielectric layer 23 has a maximum capacitance.

As shown in FIG. 2D, on the other hand, internal dielectric body 27 has a thickness T1$b$, which is smaller than the thickness T2$b$ of external dielectric body 28 in the radial direction.

When internal dielectric body 27 has a higher dielectric constant than external dielectric body 28, that is, the thickness T2$b$ of external dielectric body 28 with a lower dielectric constant is larger than the thickness T1$b$ of internal dielectric body 27 with a higher dielectric constant in the radial direction, dielectric layer 23 has a minimum capacitance.

In other words, the dielectric constant of internal dielectric body 27 and that of external dielectric body 28 are made quite different from each other. The capacitance of dielectric layer 23 with this property can be set to a desired value simply by making internal body 27 and external dielectric body 28 have different thicknesses in the radial direction. As described above, the settable range of the capacitance increases with increasing difference between the dielectric constants. This also facilitates the adjustment of the thickness ratio of internal dielectric body 27 to external dielectric 28 in order to obtain the desired capacitance.

The dielectric bodies used in the motor according to the first exemplary embodiment may have holes penetrating them along the shaft center.

As shown in FIGS. 2E and 2F, dielectric layer 23 includes internal body 27 and external dielectric body 28. In the first exemplary embodiment, internal dielectric body 27 has holes 41, which penetrate it along shaft center 42. Holes 41 allow internal dielectric body 27 to accommodate the contraction of the insulating resin of which it is made. Holes 41 also allow the adjustment of the capacitance between outer and inner cores 25 and 26.

The dielectric bodies used in the motor of the first exemplary embodiment may alternatively have recesses recessed into an inside of the dielectric bodies on their surfaces along the shaft center.

As shown in FIGS. 2E and 2G, internal dielectric body 27 has recesses 41*a* on its surface 23*a* along shaft center 42. Recess 41*a* are recessed into an inside of the dielectric body in a direction along shaft center 42 on surface 23*a*. Similar to holes 41, recesses 41*a* allow internal dielectric body 27 to accommodate the contraction of the insulating resin of which it is made, and also allow the adjustment of the capacitance between outer and inner cores 25 and 26.

The insulating resins used for dielectric layer 23 contains at least one resin that attenuates the frequencies near the resonance point of the brushless motor including dielectric layer 23. More specifically, one or both of the insulating resin used for internal dielectric body 27 and the insulating resin used for external dielectric body 28 of dielectric layer 23 are selected appropriately. This reduces vibration and noise coming from the brushless motor.

Similar effects may be obtained by attenuating the frequencies near the resonance point of the electrical device into which the brushless motor is installed instead of the frequencies near the resonance point of the brushless motor.

As apparent from the above description, the rotation body, which is a main component of the electric motor according to the first exemplary embodiment, includes an outer core, an inner core, and a dielectric layer.

The outer core is located in the outer side of the rotation body. The inner core is fixed to the shaft. The dielectric layer is located between the outer and inner cores and includes at least two dielectric bodies different in dielectric constant.

In this configuration, the capacitance of the dielectric layer increases the impedance of the rotation body, which in turn increases the impedance of the rotor. The increased impedance of the rotor reduces the high-frequency current, which flows from the rotation body toward the inner rings of the bearings via the shaft. The reduction of the high-frequency current prevents an increase in the potential of the inner rings of the bearings. The high-frequency current is generated by driving the motor.

More specifically, the occurrence of electric corrosion caused by the high-frequency current can be reduced effectively by reducing the potential difference between the inner and outer rings of the bearings. The impedance of the rotor is adjusted so that the potential difference between the inner and outer rings of the bearings is reduced. The adjustment of the impedance requires optimizing the capacitance of the dielectric layer. The optimization can be achieved by making dielectric layer 23 include at least two dielectric bodies different in dielectric constant.

More specifically, the dielectric layer has dielectric bodies arranged in at least two layers from the shaft center toward the outer side of the rotation body in the direction orthogonal to the shaft center. The thicknesses of the dielectric bodies are adjusted in the direction orthogonal to the shaft center.

The capacitance of the dielectric layer can be easily optimized by adjusting the dielectric constant and thickness of each dielectric body.

Each dielectric body has holes penetrating it in the shaft center, or recesses recessed into an inside of the dielectric body on its surface along in the direction of the shaft center. The holes or recesses may more optimize the capacitance of the dielectric layer.

The first exemplary embodiment of the present invention has described a surface permanent-magnet motor in which the magnet is glued to the outer core. Obviously, however, it is also effective to use other types of motors, such as an embedded permanent magnet motor in which a magnet is embedded in the outer core.

Second Exemplary Embodiment

Another exemplary embodiment, which is different from explained in the first exemplary embodiment, will now be described with reference to drawings. Note that components identical to those in the first exemplary embodiment will be denoted by the same reference numerals, and hence the description thereof will be omitted.

Figure 3A:
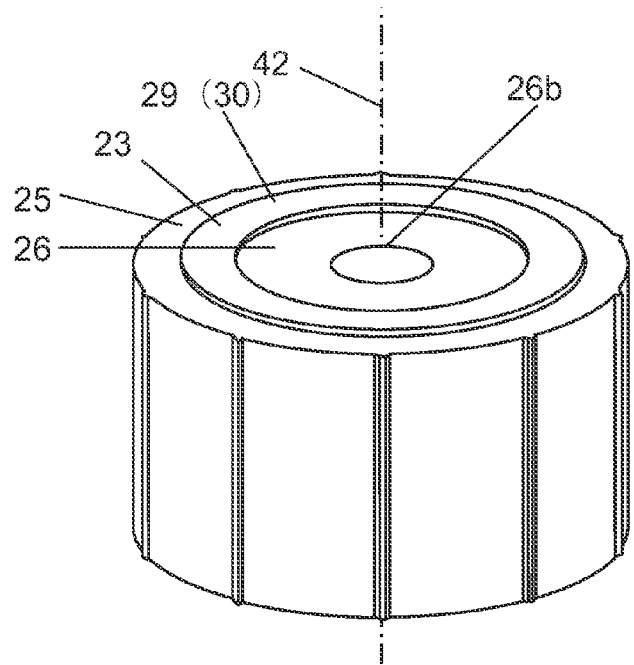
FIG. 3A is a perspective view of a rotation body of an electric motor according to a second exemplary embodiment of the present invention.
Figure 3B:
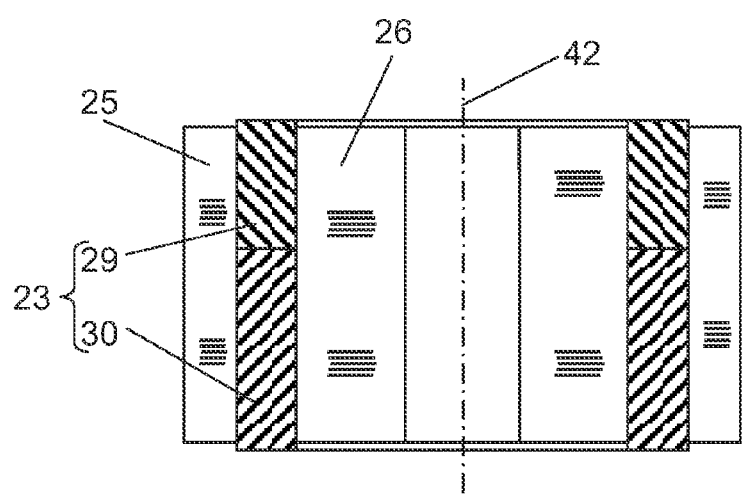
FIG. 3B is a sectional view of the rotation body of the motor according to the second exemplary embodiment of the present invention.
Figure 3C:
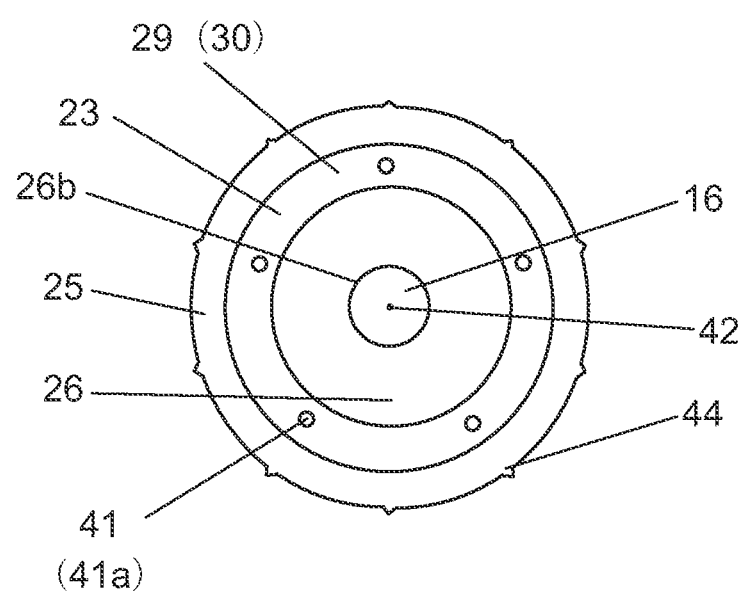
FIG. 3C is a top view of another example of the rotation body of the motor according to the second exemplary embodiment of the present invention.

FIG. 3A is a perspective view of a rotation body of an electric motor according to a second exemplary embodiment of the present invention. FIG. 3B is a sectional view of the rotation body of the motor according to the second exemplary embodiment of the present invention. FIG. 3C is a top view of another example of the rotation body of the motor according to the second exemplary embodiment of the present invention.

As shown in FIGS. 3A and 3B, dielectric layer 23 used in the motor of the second exemplary embodiment has dielectric bodies arranged in at least two layers along shaft center 42.

Explanations will now be described in detail with reference drawings.

FIG. 3A shows a rotation body from which the magnet has been removed to show outer core 25. Dielectric layer 23 is located between outer core 25 and inner core 26.

As shown in FIG. 3B, dielectric layer 23 includes at least two layers along the shaft center. In the drawing, dielectric body 29 and dielectric body 30 are located in order of the top to bottom, respectively. Dielectric bodies 29 and 30 have different dielectric constants from each other. Dielectric bodies 29 and 30 have predetermined lengths along the shaft center. The dielectric constants are preferably as far from each other as possible. As the dielectric constants are more far from each other, the range of the capacitance of dielectric layer 23 becomes broader.

More specifically, as shown in FIG. 3B, dielectric 30 is larger in length than dielectric 29 along the shaft center. In this case, if dielectric 30 has a larger dielectric constant than that of dielectric 29, dielectric layer 23 has a maximum capacitance.

In contrast, if dielectric 30 has a smaller dielectric constant than that of dielectric 29 in dielectric layer 23 shown in FIG. 3B, dielectric layer 23 has a minimum capacitance.

In other words, the dielectric constant of dielectric 29 and that of dielectric 30 are made quite different from each other. The capacitance of dielectric layer 23 with this property can be set to a desired value simply by making dielectric bodies 29 and 30 have different lengths in the direction along the shaft center. As described above, the settable range of the capacitance increases with increasing difference between the dielectric constants. This also facilitates the adjustment of the length ratio of dielectric 29 to dielectric 30 in order to obtain the desired capacitance.

In the above description, dielectric layer 23 includes dielectric bodies 29 and 30 arranged in two layers along shaft center 42. Obviously, however, the advantageous effects of the second exemplary embodiment can be obtained when the dielectric layer 23 includes dielectric bodies in the form of three or more layers.

The dielectric bodies used in the motor according to the second exemplary embodiment may have holes penetrating them along the shaft center.

As shown in FIG. 3C, dielectric layer 23 includes dielectric bodies 29 and 30. In the second exemplary embodiment, dielectric bodies 29 and 30 have holes 41, which penetrate them along shaft center 42. Holes 41 allow dielectric bodies 29 and 30 to accommodate the contraction of the insulating resins of which dielectric layer 23 is made, and also allow the adjustment of the capacitance between outer and inner cores 25 and 26.

The dielectric bodies used in the motor according to the second exemplary embodiment may include recesses recessed into an inside of the dielectric bodies on their surface in the direction along the shaft center.

More specifically, recesses 41a may be provided instead of holes 41 shown in FIG. 3C. Recesses 41a are formed on surface 23a of the dielectric bodies along shaft center 42 so as to recess into an inside of the dielectric bodies. Similar to holes 41, recesses 41a allow dielectric bodies 29 and 30 to accommodate the contraction of the insulating resins of which they are made. Recesses 41a also allow internal dielectric body to adjust the capacitance between outer core 25 and inner core 26.

Third Exemplary Embodiment

The most effective example among those described in the second exemplary embodiment will now be described with reference to drawings. Note that components identical to those in the first and second exemplary embodiments will be denoted by the same reference numerals, and hence the description thereof will be omitted.

Figure 4A:
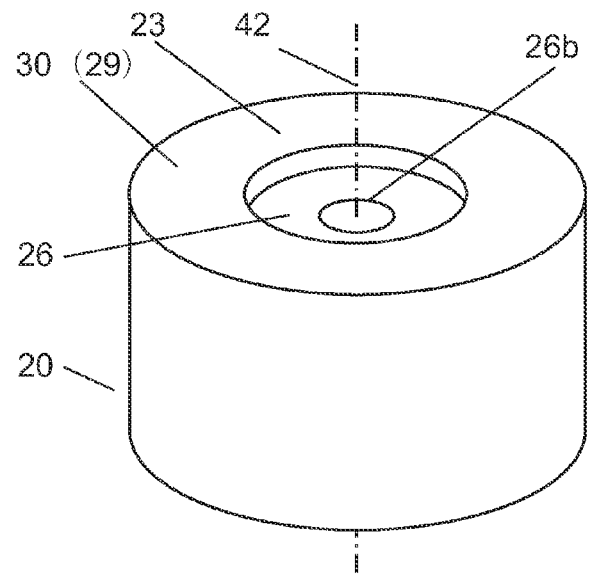
FIG. 4A is a perspective view of a rotation body of an electric motor according to a third exemplary embodiment of the present invention.
Figure 4B:
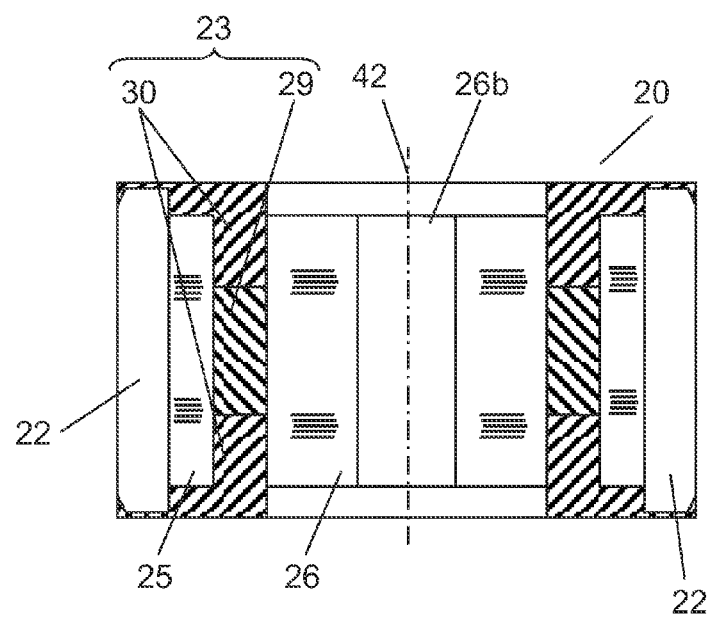
FIG. 4B is a sectional view of the rotation body of the motor according to the third exemplary embodiment of the present invention.
Figure 4C:
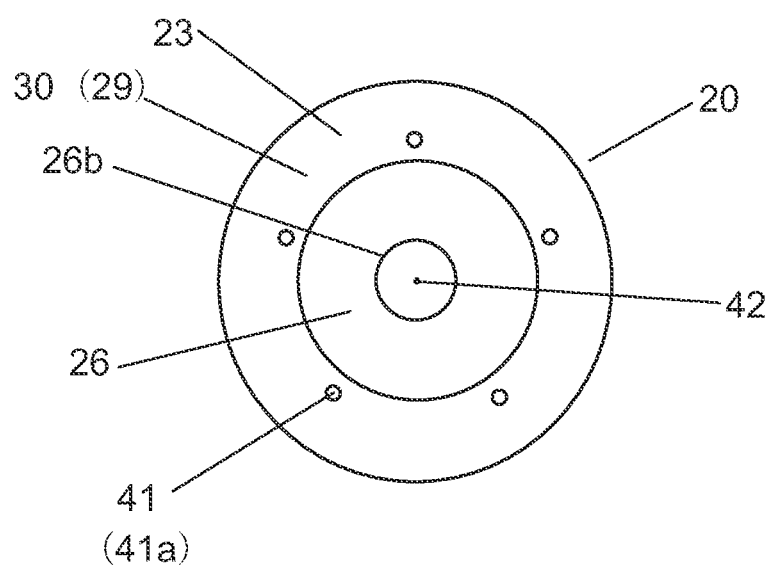
FIG. 4C is a top view of another example of the rotation body of the motor according to the third exemplary embodiment of the present invention.

FIG. 4A is a perspective view of a rotation body of an electric motor according to a third exemplary embodiment of the present invention. FIG. 4B is a sectional view of the rotation body of the motor according to the third exemplary embodiment of the present invention. FIG. 4C is a top view of another example of the rotation body of the motor according to the third exemplary embodiment of the present invention.

As shown in FIGS. 4A and 4B, dielectric layer 23 used in the motor according to the third exemplary embodiment of the present invention includes dielectric bodies 29 and 30 in the form of three or more layers. Dielectric bodies 30, which are located on both sides of dielectric 29 in the direction along shaft center 42, have the same dielectric constant.

Explanations will now be described in detail with reference to drawings.

Dielectric layer 23 is located such that dielectric bodies 30 sandwich dielectric 29 along the shaft center as shown in FIGS. 4A and 4B. Rotation body 20 can be easily molded by disposing dielectric bodies 30 to sandwich dielectric 29 from above and below as in FIGS. 4A and 4B. Thus, dielectric layer 23 and magnet 22 is easily integrally molded to form rotation body 20. Magnet 22 can be, for example, a ferrite sintered magnet. A plurality of magnets 22 are fixed to rotation body 20.

In this case, using an adhesive to glue magnets 22 to outer core 25 may cause the following malfunction. When rotor 14 is rotated at high speed, magnet 22 may become detached and fallen from rotation body 20. To avoid this occurrence, rotation body 20 is integrally molded with magnets 22.

The integral molding of rotation body 20 can be easily performed in the following manner. First, dielectric 29, which has a predetermined length along shaft center 42, is sandwiched between outer and inner cores 25 and 26. Next, dielectric bodies 30 are molded integrally with magnets 22 fixed to outer core 25. With this procedure, dielectric layer 23 could have dielectric bodies 29 and 30 arranged in three or more layers along shaft center 42.

In this case, the capacitance between outer and inner cores 25 and 26 can be changed as follows. The length ratio of dielectric 29 to dielectrics 30 adjacent to dielectric 29 along shaft center 42 can be adjusted, thereby obtaining a desired capacitance.

The dielectric bodies used in the electric motor according to the third exemplary embodiment may have holes penetrating them along the shaft center.

As shown in FIG. 4C, dielectric layer 23 includes dielectric bodies 29 and 30. In the third exemplary embodiment, dielectric bodies 29 and 30 have holes 41. Holes 41 penetrate dielectric bodies 29 and 30 along shaft center 42. Holes 41 allow dielectric bodies 29 and 30 to accommodate the contraction of the insulating resins of which dielectric layer 23 is made, and also allow the adjustment of the capacitance between outer and inner cores 25 and 26.

The dielectric bodies used in the motor according to the third exemplary embodiment may include recesses on their surface along the shaft center so as to recess into an inside of the dielectric bodies.

More specifically, recesses 41a may be provided instead of holes 41 shown in FIG. 4C. Recesses 41a are formed on surface 23a of the dielectric bodies along shaft center 42 so as to recess into an inside of the dielectric bodies. Similar to holes 41, recesses 41a allow dielectric bodies 29 and 30 to accommodate the contraction of the insulating resins of which they are made. Recesses 41a also allow internal dielectric body to adjust the capacitance between outer core 25 and inner core 26.

Fourth Exemplary Embodiment

Another exemplary embodiment, which is different from the first to third ones, will now be described with reference to drawings. Note that components identical to those in the first to third exemplary embodiments will be denoted by the same reference numerals, and hence the description thereof will be omitted.

Figure 5A:
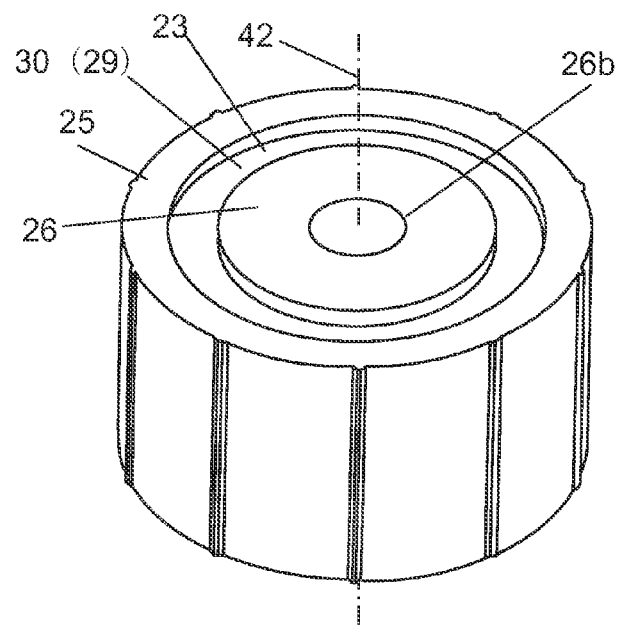
FIG. 5A is a perspective view of a rotation body of an electric motor according to a fourth exemplary embodiment of the present invention.
Figure 5B:
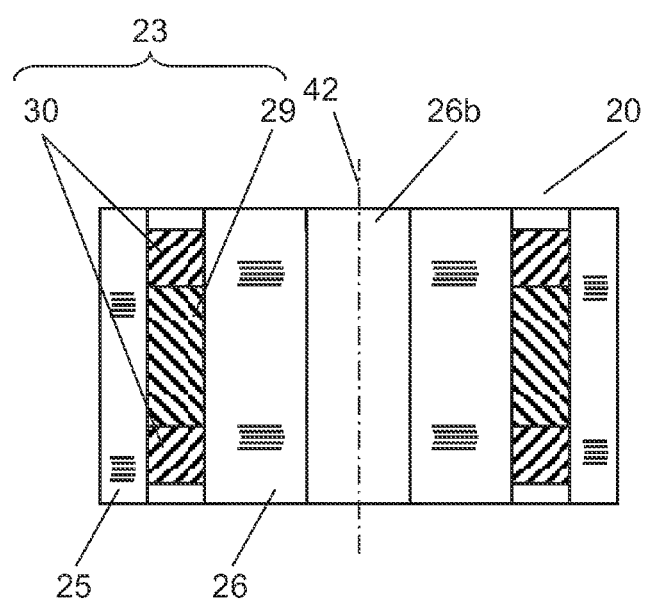
FIG. 5B is a sectional view of the rotation body of the motor according to the fourth exemplary embodiment of the present invention.
Figure 5C:
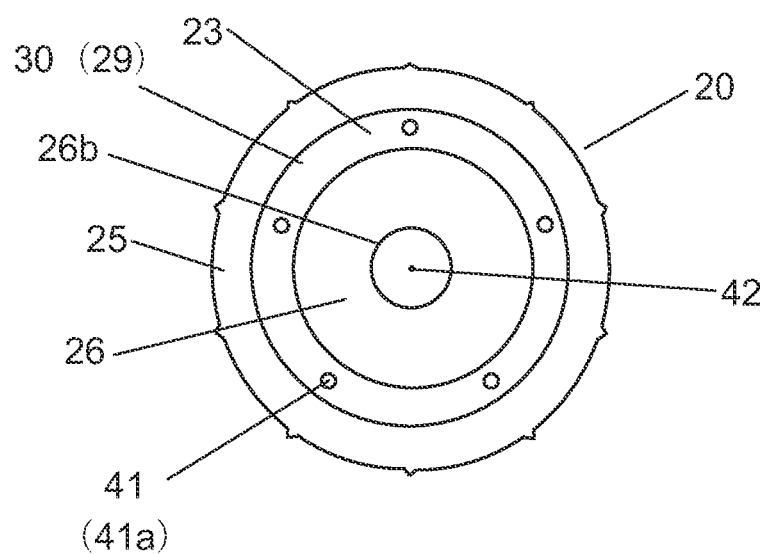
FIG. 5C is a top view of another example of the rotation body of the motor according to the fourth exemplary embodiment of the present invention.

FIG. 5A is a perspective view of a rotation body of an electric motor according to a fourth exemplary embodiment of the present invention. FIG. 5B is a sectional view of the rotation body of the motor according to the fourth exemplary embodiment of the present invention. FIG. 5C is a top view of another example of the rotation body of the motor according to the fourth exemplary embodiment of the present invention.

As shown in FIGS. 5A and 5B, dielectric layer 23 used in the motor according to the fourth exemplary embodiment of the present invention is shorter in length along shaft center 42 than the shorter one of outer and inner cores 25 and 26.

Explanations will now be described in detail with reference drawings.

In some cases, it is desired to obtain a much smaller capacitance than those in the first to third exemplary embodiments. The capacitance between outer core 25 and inner and inner core 26 can be further reduced as follows. As shown in FIGS. 5A and 5B, dielectric layer 23 is made shorter along shaft center than the shorter one of outer core 25 and inner core 26. More specifically, as shown in FIGS. 5A and 5B, the length of dielectric layer 23 is defined by dielectric bodies 29 and 30. The length of dielectric layer 23 corresponds to the total length of dielectric bodies 29 and 30 along the shaft. The length of dielectric layer 23 is shorter than either that of outer core 25 or that of inner core 26. Or, the length of dielectric layer 23 is shorter than both of outer core 25 and inner cores 26.

Thus, the length of dielectric layer 23, which corresponds to the total length of dielectric bodies 29 and 30, is made shorter than the length of outer core 25 or the length of inner core 26 along shaft center 42. In this configuration, the dielectric layer made of the insulating resins is shorter than the rotor core formed of outer core 25 and inner core 26 along shaft center 42. In this case, an air layer is formed between outer core 25 and inner core 26 in place of dielectric layer 23 made of the insulating resins. In general, air has a lower dielectric constant than insulating resins. Therefore, it is possible to adjust the position of the dielectric bodies in the space between cores 25 and 26 along shaft center 42. More specifically, the air layer has a higher proportion in dielectric layer 23. An increase in the proportion of the air layer in the space between outer core 25 and inner core 26 results in reducing the capacitance between outer core 25 and inner core 26.

The dielectric bodies used in the motor according to the fourth exemplary embodiment have holes penetrating them along the shaft center.

As shown in FIG. 5C, dielectric layer 23 includes dielectric bodies 29 and 30. In the fourth exemplary embodiment, dielectric bodies 29 and 30 have holes 41. Holes 41 penetrate dielectric bodies 29 and 30 along shaft center 42. Holes 41 allow dielectric bodies 29 and 30 to accommodate the contraction of the insulating resins of which dielectric layer 23 is made. Holes 41 also allow the adjustment of the capacitance between outer core 25 and inner core 26.

The dielectric bodies used in the motor according to the fourth exemplary embodiment may include recesses on their surface along the shaft center.

More specifically, recesses 41a may be provided instead of holes 41 shown in FIG. 5C. Recesses 41a are formed on surface 23a of the dielectric bodies along shaft center 42 so as to recess into an inside of the dielectric bodies. Similar to holes 41, recesses 41a allow dielectric bodies 29 and 30 to accommodate the contraction of the insulating resins of which they are made. Recesses 41a also allow internal dielectric body to adjust the capacitance between outer core 25 and inner core 26.

Fifth Exemplary Embodiment

An electrical device in which the electric motor described in the first to fourth exemplary embodiments has been mounted will now be described with reference to drawings. In this exemplary embodiment, an air-conditioning indoor unit is described as the electrical device.

Figure 6:
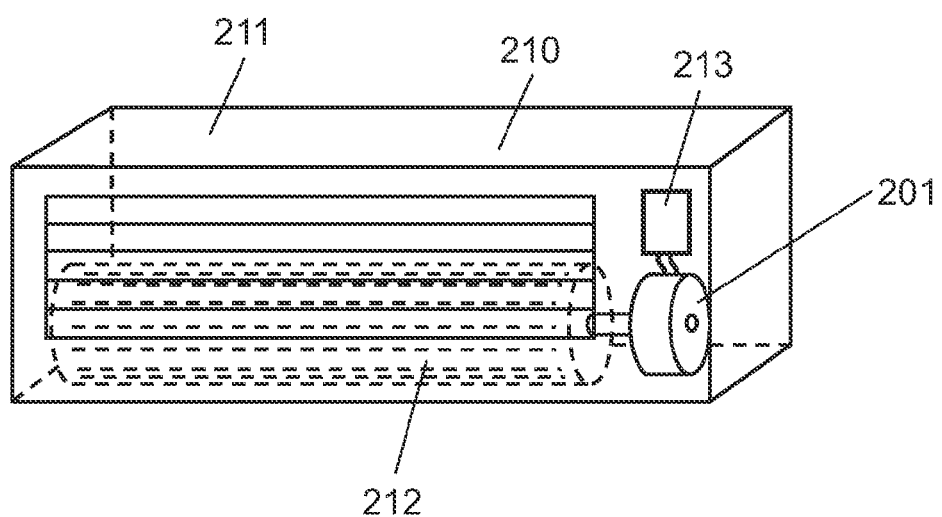
FIG. 6 is a schematic diagram of an air-conditioning indoor unit including the motor of any one of the first to fourth exemplary embodiments of the present invention.

FIG. 6 is a schematic diagram of the air-conditioning indoor unit including the motor of any one of the first to fourth exemplary embodiments of the present invention.

As shown in FIG. 6, air-conditioning indoor unit 210, which is the electrical device of the fifth exemplary embodiment of the present invention includes electric motor 201, and motor driving device 213, which is a drive section for driving electric motor 201.

Explanations will now be described in detail with reference to drawings.

As shown in FIG. 6, air-conditioning indoor unit 210 has housing 211 in which electric motor 201 is to be mounted. Electric motor 201 has a rotation shaft to which cross-flow fan 212 is to be attached. Housing 211 includes a heat exchanger.

Electric motor 201 is driven by motor driving device 213, which is the drive section. Motor driving device 213 sends a drive signal to electric motor 201. Electric motor 201 is rotates according to the drive signal. Cross-flow fan 212 rotates as electric motor 201 rotates. Cross-flow fan 212 rotates to blow the air conditioned by the heat exchanger into a living room equipped with the air-conditioning indoor unit. The brushless motor described in the first to fourth exemplary embodiments can be used as electric motor 201.

In the above description, the air-conditioning indoor unit is shown as a specific example of the electrical device according to the fifth exemplary embodiment of the present invention. The above described specific example may be applied to the electric motor used for air-conditioning outdoor units and other various information and industrial devices.

The fifth exemplary embodiment of the present invention has described a surface permanent-magnet motor in which the magnet is fixed to the outer core. It is also similarly effective to use an embedded permanent magnet motor in which a magnet is embedded in the outer core.

INDUSTRIAL APPLICABILITY

The electric motor according to the exemplary embodiments of the present invention reduces occurrence of electric corrosion in the bearings by reducing the shaft voltage. The motor is suitable for use in electrical devices such as air-conditioning indoor and outdoor units that are expected to include a less expensive, longer-life motor.

The invention claimed is:
1. An electric motor comprising:
a stator including a stator core around which a winding is wound;
a rotor including:
a rotation body including a permanent magnet extending circumferentially and facing the stator, and
a shaft passing through a shaft center of the rotation body;
a pair of bearings rotatably supporting the shaft; and
a pair of brackets fixing the bearings,
wherein the rotation body further includes:
an outer iron core located in an outer side of the rotation body;
an inner iron core fixed to the shaft; and
a dielectric layer located between the outer and inner iron cores, the dielectric layer comprising at least two dielectric bodies different in dielectric constant,
wherein the at least two dielectric bodies are formed throughout an entire circumferential direction of the rotation body.

2. The electric motor of claim 1, wherein the dielectric layer includes the at least two dielectric bodies arranged in at least two layers from the shaft center toward an outer side of the rotation body in a direction orthogonal to the shaft center.

3. The electric motor of claim 1, wherein the dielectric layer includes the dielectric bodies arranged in at least two layers in a direction along the shaft center.

4. The electric motor of claim 3, wherein
the dielectric layer includes the dielectric bodies arranged in at least three layers in the direction along the shaft center; and
the dielectric bodies located at both ends in the direction along the shaft center have an identical dielectric constant.

5. The electric motor of claim 1, wherein the dielectric bodies have holes penetrating the dielectric bodies in the direction along the shaft center.

6. The electric motor of claim 1, wherein the dielectric bodies respectively have recesses recessed into an inside of the dielectric bodies on surfaces of the dielectric bodies in the direction along the shaft center.

7. The electric motor of claim 1, wherein the dielectric layer is shorter in length in the direction along the shaft center than a shorter one of the outer and inner iron cores.

8. An electrical device comprising:

the electric motor of claim 1; and a drive section for driving the electric motor.

9. The electric motor of claim 2, wherein the dielectric bodies have holes penetrating the dielectric bodies in the direction along the shaft center.

10. The electric motor of claim 3, wherein the dielectric bodies have holes penetrating the dielectric bodies in the direction along the shaft center.

11. The electric motor of claim 2, wherein the dielectric bodies respectively have recesses recessed into an inside of the dielectric bodies on surfaces of the dielectric bodies in the direction along the shaft center.

12. The electric motor of claim 3, wherein the dielectric bodies respectively have recesses recessed into an inside of the dielectric bodies on surfaces of the dielectric bodies in the direction along the shaft center.

13. The electric motor of claim 2, wherein the dielectric layer is shorter in length in the direction along the shaft center than a shorter one of the outer and inner iron cores.

14. The electric motor of claim 3, wherein the dielectric layer is shorter in length in the direction along the shaft center than a shorter one of the outer and inner iron cores.

* * * * *